United States Patent
Kohn (10) Patent No.: US 11,960,024 B2
(45) Date of Patent: Apr. 16, 2024

(54) ANGLE MEASUREMENT SYSTEM FOR AUTOMOTIVE COLLISION AVOIDANCE SENSORS

(71) Applicant: Jacob Kohn, Cape Coral, FL (US)

(72) Inventor: Jacob Kohn, Cape Coral, FL (US)

( * ) Notice: Subject to any disclaimer, the term of this patent is extended or adjusted under 35 U.S.C. 154(b) by 511 days.

(21) Appl. No.: 16/931,858

(22) Filed: Jul. 17, 2020

(65) Prior Publication Data

US 2021/0018629 A1    Jan. 21, 2021

Related U.S. Application Data (60) Provisional application No. 62/875,620, filed on Jul. 18, 2019.

(51) Int. Cl.
| | | |
|---|---|---|
| *G01S 7/40* | (2006.01) | |
| *G01S 7/497* | (2006.01) | |
| *G01S 17/86* | (2020.01) | |
| *G01S 17/931* | (2020.01) | |

(52) U.S. Cl.
CPC ............ *G01S 7/4026* (2013.01); *G01S 7/497* (2013.01); *G01S 17/86* (2020.01); *G01S 17/931* (2020.01)

(58) Field of Classification Search
None
See application file for complete search history.

(56) References Cited

U.S. PATENT DOCUMENTS

| | | | | |
|---|---|---|---|---|
| 9,718,405 | B1* | 8/2017 | Englander | B60Q 9/008 |
| 10,579,065 | B2* | 3/2020 | Wang | G05D 1/0088 |
| 10,724,855 | B2* | 7/2020 | Kroll | G01B 11/2755 |
| 2005/0073433 | A1* | 4/2005 | Gunderson | G01S 13/931 |
| | | | | 340/903 |
| 2008/0119978 | A1* | 5/2008 | Stieff | G01B 11/2755 |
| | | | | 701/31.4 |
| 2018/0354468 | A1* | 12/2018 | Krishnan | B60S 1/56 |
| 2020/0023788 | A1* | 1/2020 | Frederick | G01S 7/02 |
| 2020/0105018 | A1* | 4/2020 | Corghi | G01B 11/272 |

FOREIGN PATENT DOCUMENTS

WO    WO-2020136623 A1 *    7/2020    ............. B60R 11/02

* cited by examiner

*Primary Examiner* — Shelby A Turner
*Assistant Examiner* — Brandon J Becker
(74) *Attorney, Agent, or Firm* — William E. Noonan (57) ABSTRACT

A system for measuring the orientation angle of automotive collision avoidance sensors. An adaptive spacer is supported to conformably interengage the collision avoidance sensor module of a vehicle being repaired. The adaptive spacer extends outwardly from the sensor module and the orientation angle of the sensor module is transposed by the adaptive spacer to form an angular guideline on an underlying calibration board, mat or other surface. The angle between the angular guideline and a base guideline parallel to the center line of the vehicle and the angular guideline is measured to provide the orientation angle of the vehicle's sensor module.

14 Claims, 11 Drawing Sheets

ANGLE MEASUREMENT SYSTEM FOR AUTOMOTIVE COLLISION AVOIDANCE SENSORS

RELATED APPLICATION

This application claims the benefit of U.S. Provisional Application Ser. No. 62/875,620 filed Jul. 18, 2019.

FIELD OF THE INVENTION

This invention relates to a system for quickly, conveniently and accurately measuring the angle at which a collision avoidance sensor is mounted to an automotive vehicle so that a sensor on a vehicle being repaired may be reliably adjusted to conform to its proper, factory prescribed angular setting.

BACKGROUND OF THE INVENTION

Collision avoidance systems are becoming increasingly commonplace in most motor vehicles. Such systems including, but not limited to, blind spot and cross traffic alert detectors typically employ radar sensors mounted to the rear bumper, rear quarter panel or elsewhere on the vehicle. These sensors are oriented and set at specific factory prescribed vertical and horizontal angular settings. Automotive manufacturers provide for very precise sensor angle specifications for each make and model of vehicle they produce. These specifications are designed to allow the vehicle to operate more safely and reliably.

Often, when a motor vehicle is involved in a collision or otherwise damaged, the collision avoidance sensors are disrupted. In some cases, the sensors themselves are damaged and must be repaired or replaced. In other situations, body work must be performed, which is likely to alter the positioning and orientation of the sensor such that the sensor is not directed according to its factory prescribed angular specifications. In each such case, the affected radar sensors must be realigned to make sure they are properly set and accurately oriented before the vehicle can be operated safely.

Currently, it is extremely difficult to quickly and accurately realign the vehicle's radar sensors and to maintain the correct alignment when performing repair or body work. If a sensor varies even a minute amount from its specified settings, the intended detection zone of the sensor is apt to be adversely affected. For example, even a variance in the mounting of the sensor to the vehicle of as little as 1-2 millimeters can change the sensor's detection range at a distance of 20' by as much as by 4-5'. Not only does this render the collision avoidance system unsafe and unreliable, it is also likely to trigger a trouble code in the vehicle's diagnostic system. This is apt to disable the collision avoidance system entirely. Moreover, although conventional vehicle diagnostic systems can detect that the collision avoidance sensors are misaligned, they are not able to accurately report how many degrees the sensor is out of alignment or in what direction or to what degree the sensor must be readjusted to bring it into proper alignment.

Currently, there is no system available for quickly, conveniently and reliably calibrating and/or measuring automotive collision avoidance sensors so that they are properly aligned on a motor vehicle following body work or repair. The sensors must be tediously installed, tested, adjusted and re-tested as the repairs or work are being performed. This can significantly increase the time and cost required to properly complete the automotive body or repair work. In many cases, the misalignment is not discovered until the work is already completed and the vehicle has returned to the road. This usually requires the vehicle to be returned to the repair shop, which can cause even greater inconvenience, expense, delays and frustration both for the shop and the customer.

SUMMARY OF THE INVENTION

It is therefore an object of the present invention to provide a system for quickly, conveniently and accurately measuring the angular orientation of a motor vehicle collision avoidance sensor so that the sensor may be accurately aligned in the course of repairing the vehicle.

It is a further object of this invention to provide a collision avoidance sensor measurement system that may be readily adapted to work effectively on virtually all makes and models or motor vehicles.

It is a further object of this invention to provide a collision avoidance sensor measurement system that enables a vehicle's collision avoidance sensors to be quickly, conveniently and accurately adjusted in accordance with predetermined factory settings following a collision or other damage to the vehicle and in conjunction with body work or repairs being performed on the vehicle.

It is a further object of this invention to provide a collision avoidance sensor measurement system that enables automotive bodywork and repairs to be performed more quickly, conveniently and efficiently and which significantly reduces the time, expense and errors commonly associated with realignment of the collision avoidance sensors.

This invention relates to a system for measuring and calibrating the radar sensors of an automotive collision avoidance system. The system includes a spacer component having an inner end that includes a sensor for flushly and conformably interengaging a collision avoidance sensor module mounted to the vehicle such that the spacer extends outwardly therefrom. Means are provided proximate a distal end of the spacer for forming an angular guideline on the underlying surface that supports the motor vehicle. The angular guideline intersects a base guideline that extends along the underlying surface and is parallel to a center line of the vehicle. An angle measuring gauge is used to measure the angle between the base guideline and the angular guideline, which corresponds to the angle at which the collision avoidance sensor module is directed from the vehicle.

In a preferred embodiment, the system further includes a frame assembly including a lower frame that is mounted on the underlying surface. An upper frame is adjustably mounted on the lower frame and is movable back and forth along the lower frame in respective directions parallel and perpendicular to the center line of the vehicle. A calibration board is adjustably supported on the upper frame and is movable thereon in opposing directions that are perpendicular to both the center line of the vehicle and the longitudinal axis of travel of the upper frame relative to the lower frame. The calibration board may include a longitudinal side edge that defines the base guideline.

The spacer may be mounted to a vertical support post that engages and extends upwardly from art upper surface of the calibration board. The vertical support post may include planar opposing forward and rearward sides. The spacer element may be secured by an L-bracket or otherwise to the forward side of the post at a selected height that corresponds with the height at which the sensor module is mounted. The opposite rearward side of the vertical support post forms, at its lower end, the angular guideline on the calibration board.

The longitudinal side edge of the calibration board may include an elongate lip that defines the base guideline, which is parallel to the center line of the vehicle.

The lower frame may be held in place such that the side edge and lip of the calibration board remain parallel to the center line of the vehicle by a tire-engaging box component. The tire engaging box component may include a plurality of tire alignment tabs that engage the wheel rim. The box is, in turn, interconnected to the lower frame such that the lower frame is maintained in position and the base guideline of the calibration board remains parallel to the center line of the vehicle.

To measure the sensor angle in the foregoing version, the lower frame and tire engaging box, as well as the movably interconnected upper frame and calibration board are assembled beneath and adjacent to the vehicle and below the area to which the sensor module is mounted. The vertical support post and supported spacer are adjusted and the inner face of the spacer is flushly and conformably interengaged, with the sensor module. This positions the vertical support element such that the planar outer side of the support post defines the angular guideline on the calibration board. A digital angle gauge is then inserted into the calibration board between the base guideline (defined by the longitudinal side edge or tip of the calibration board) and the angular guideline (defined by the rearward side of the support post). The measured angle is the angle at which the sensors are directed from the vehicle In an alternative embodiment, the distal outer end of the spacer element may carry a laser line projector, which is operated to generate a laser marking line across the calibration board, which represents the angular guideline. The angular gauge is then used to measure the angle between the laser line projected angular guideline and the base guideline, which is again defined by the elongate side edge or lip of the calibration board.

In another version, a calibration mat may be used in place of the calibration board and supportive upper and lower frames. In this version, the spacer is again supported by a vertical support post. The calibration mat may include a plurality of parallel calibration lines that are themselves all parallel to the center line of the vehicle. The vertical support post again includes planar forward and rearward facing longitudinal sides. The vertical support post is engaged with and extends upwardly from the calibration mat and the spacer is mounted on the vertical support at a height appropriate to engage the sensor module on the vehicle. The lower end of the rearward side of the vertical support post defines the angular guideline and a selected parallel calibration line on the calibration mat defines the base guideline. An angle gauge is used to measure the angle between the base guideline and the angular guideline, which again provides the measurement of the sensor's angular orientation.

In still another embodiment of the invention, the sensor angle may be determined by marking a center line beneath the vehicle. A vertical support post and attached spacer are then interengaged with the sensor module in the manner previously described. A pivoting generally V-shaped guideline tracking tool is then used the measure the angle. The pivoting V-shaped guideline tracking tool employs a pair of elongate arms. One of the arms is aligned with the center line of the vehicle. The other arm is pivoted open and engaged with the rearward side of the support post, which supports the spacer for engaging the sensor module as previously described. The first arm of the tracking tool forms the base guideline and the second arm is aligned with the angular guideline defined by the rearward planar side of the vertical support element. A digital angle gauge is then interengaged with the tracking tool and used to measure the angle between the two arms, which in turn provides the angle at which the collision avoidance sensor is directed.

Using any of the foregoing embodiments, the angular orientation of the collision avoidance sensors may be quickly and accurately determined. Additional bodywork can then be conveniently and effectively completed to realign the sensor as needed and direct the sensor according to the factory specified parameters.

BRIEF DESCRIPTION OF THE DRAWINGS

Other objects, features and advantages will occur from the following description of a preferred embodiment and the accompanying drawings, in which.

DETAILED DESCRIPTION OF PREFERRED EMBODIMENTS

Figure 1:
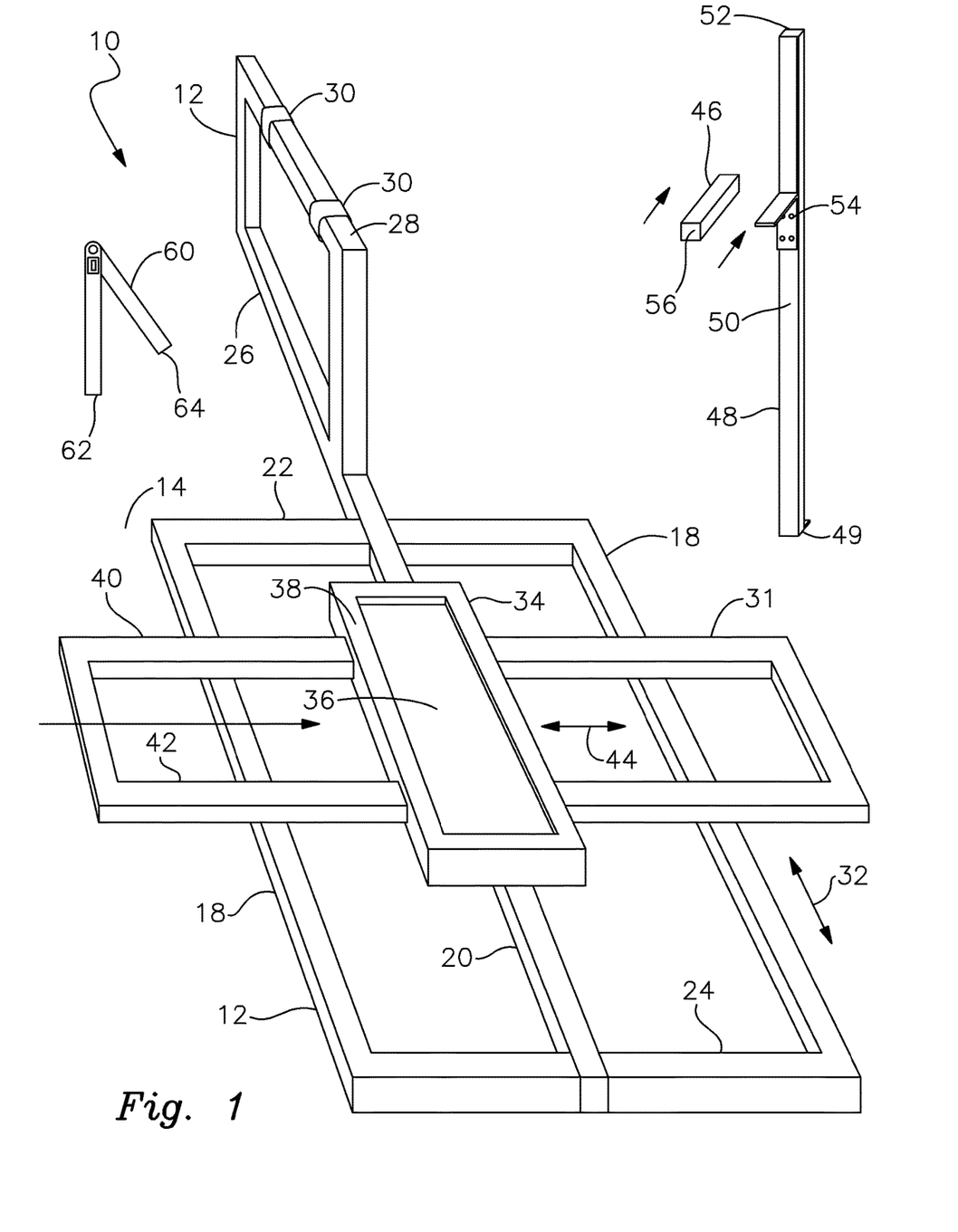
FIG. 1 is a perspective view of the components employed in a preferred measurement system according to this invention.

There is shown in FIG. 1 an angle measurement system 10 for radar sensors of the type employed in automotive collision avoidance systems. These may include, but are not limited to, various types of collision avoidance sensors such as blind spot, cross traffic and backup sensors. The sensor technology involved with the measurement system of this invention typically comprises radar and analogous (laser) based sensor systems. The construction, installation and use of such technology and of automotive collision avoidance systems in general is conventional and will be understood to persons skilled in the art. System 10, as well as the alternative measurement systems disclosed herein may be employed on virtually all makes and models of vehicles employing collision avoidance sensor technology.

Figure 2:
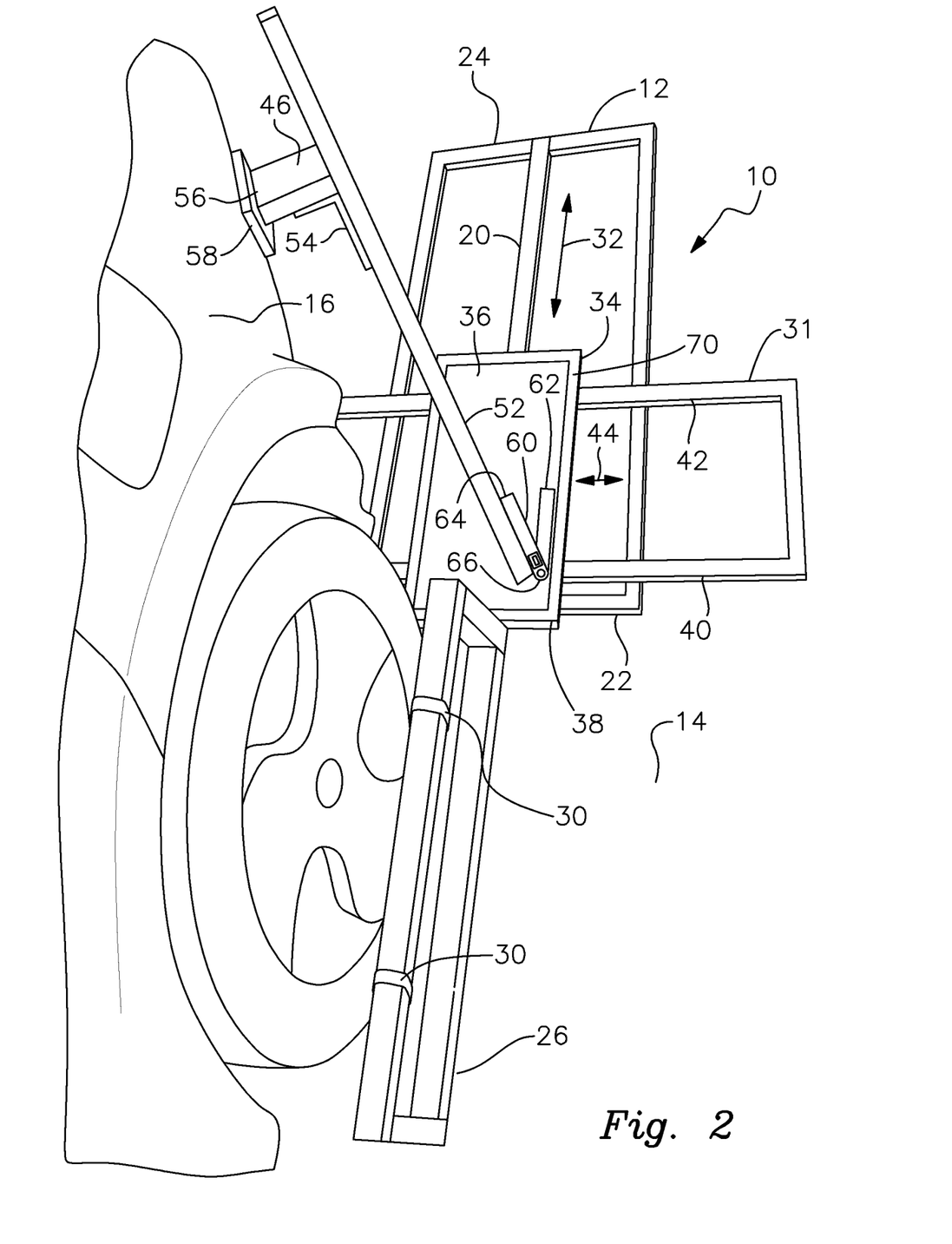
FIG. 2 is a top perspective view of the embodiment of FIG. 1 as operatively engaged with a sensor module in the rear bumper or quarter panel of a vehicle being repaired.
Figure 3:
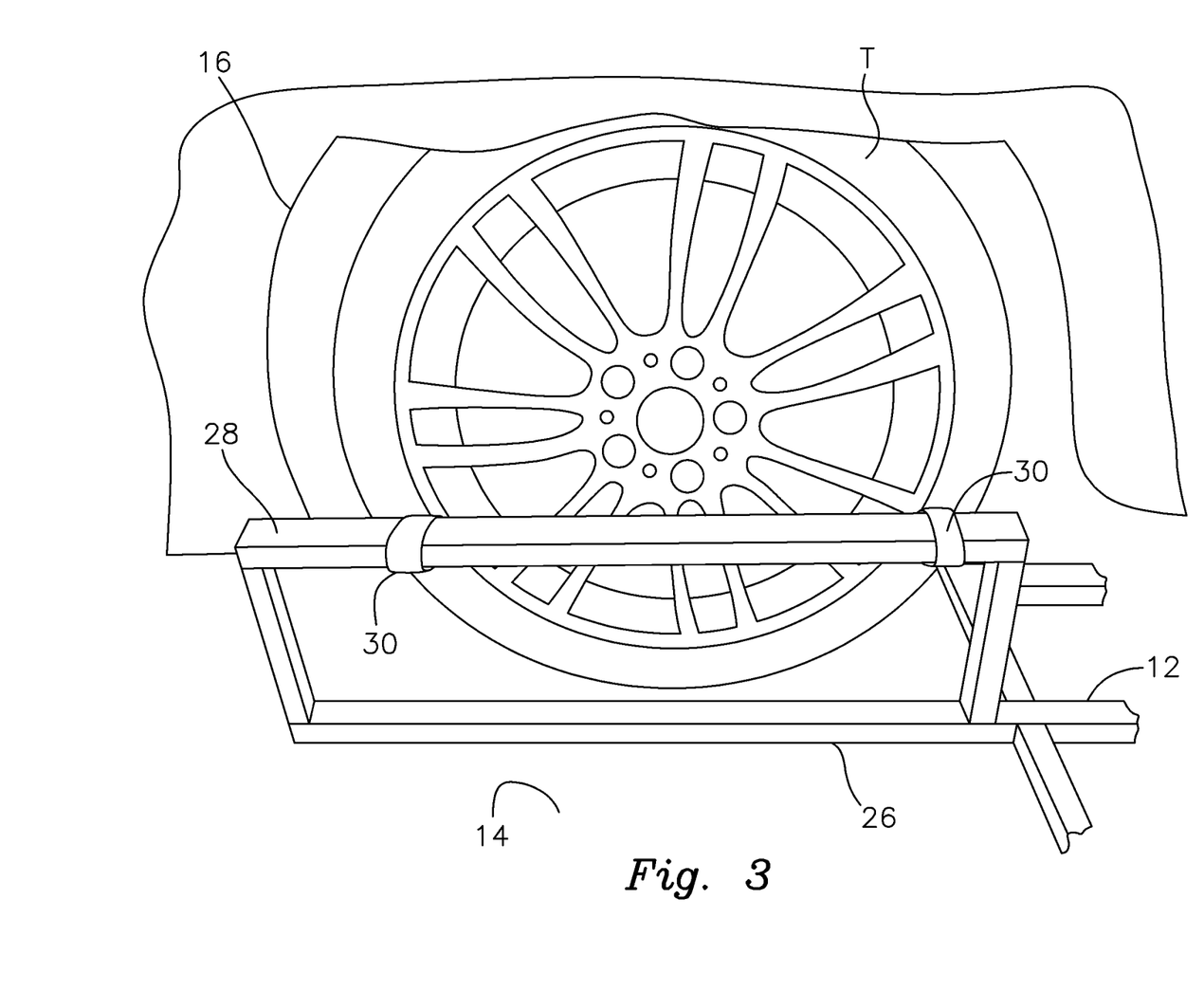
FIG. 3 is a side elevational view depicting the tire engaging box of the embodiment of FIG. 1.
Figure 7:
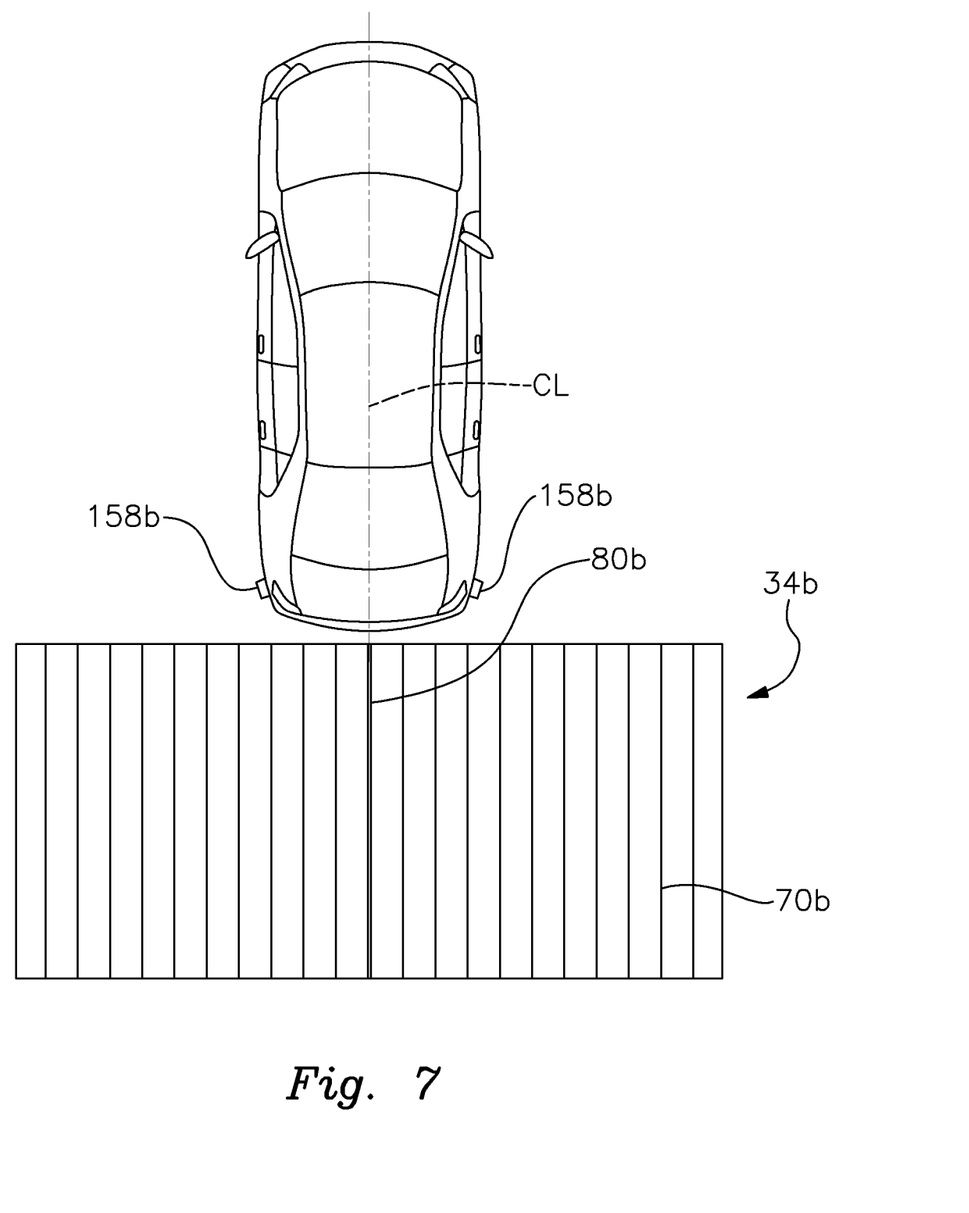
FIG. 7 is a plan view of a third preferred version of the measurement system employing a calibration mat.
Figure 8A:
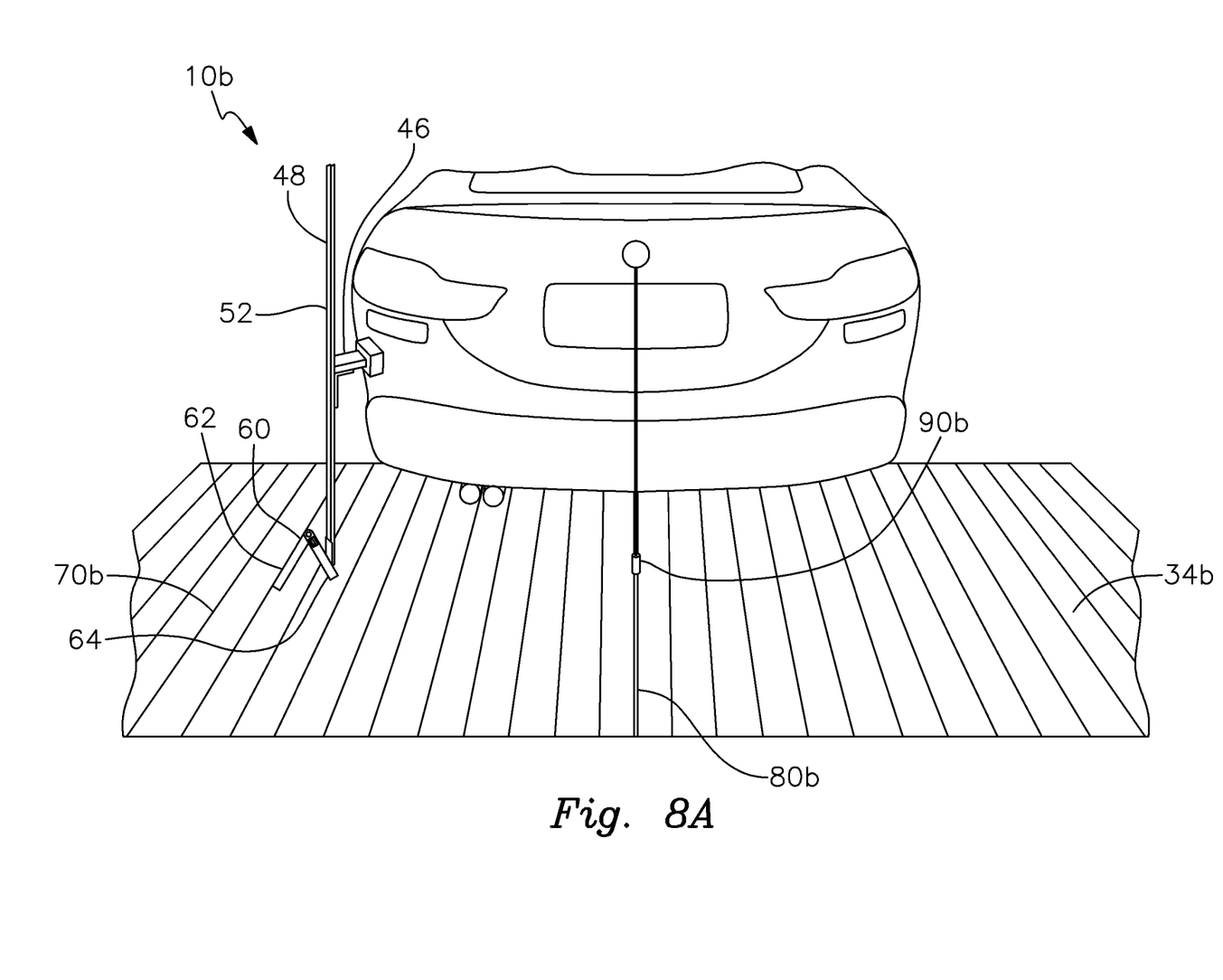
FIG. 8A is a rear perspective view of the calibration mat version of this invention, with the individual components assembled for use in measuring a vehicle's collision avoidance sensor angle.
Figure 8B:
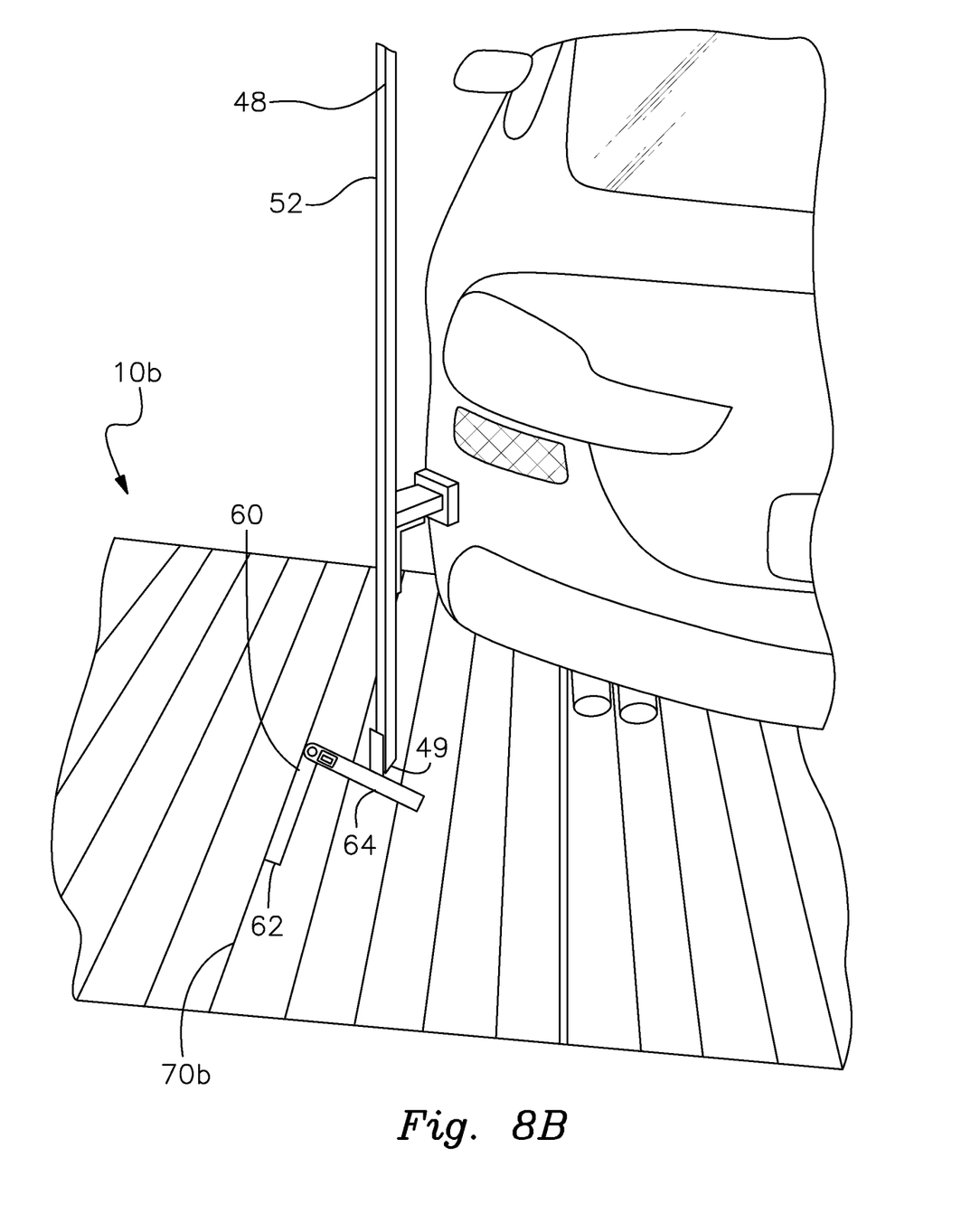
FIG. 8B is an alternative perspective view of the version of FIG. 8A.
Figure 9:
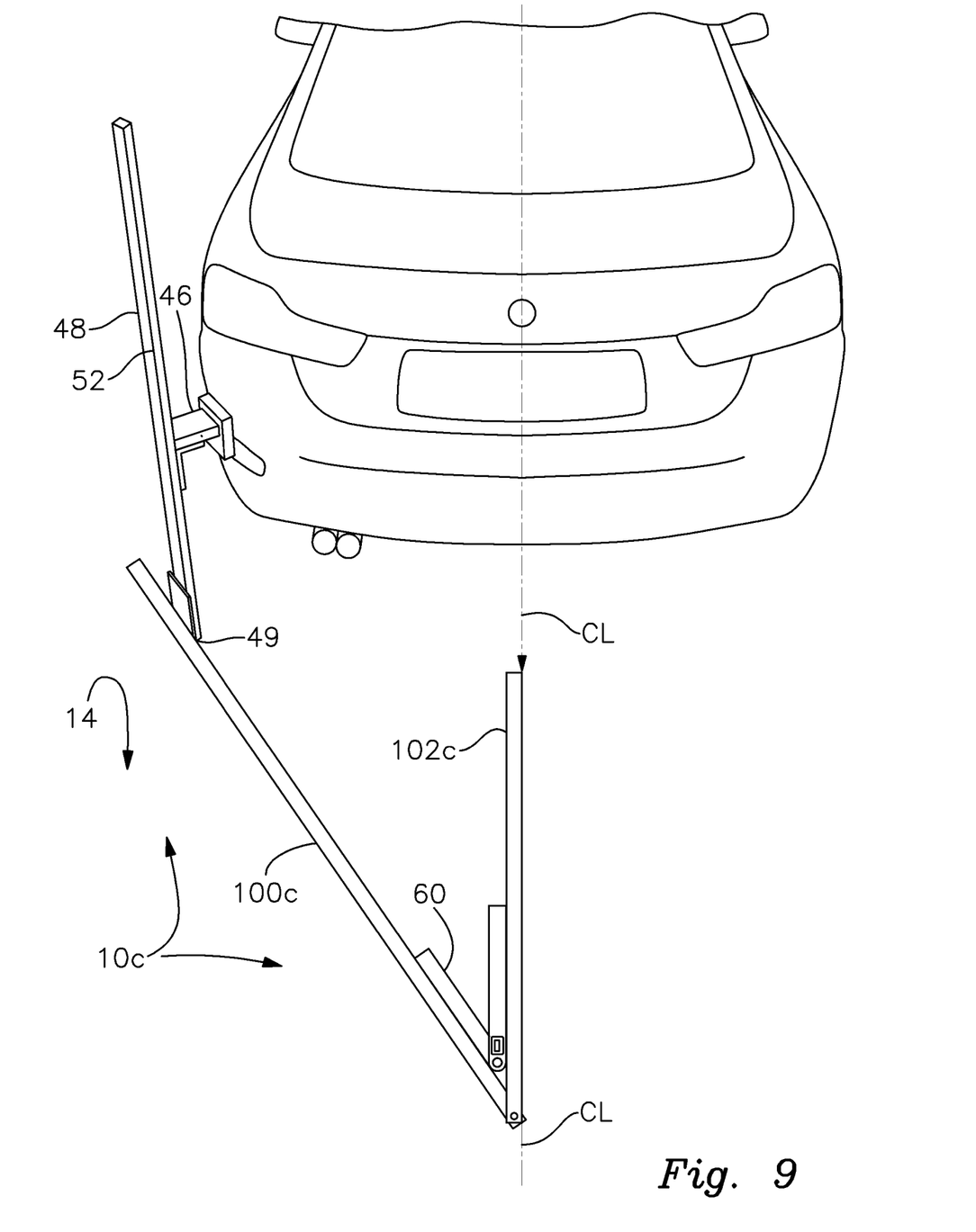
FIG. 9 a rear perspective view of a fourth preferred embodiment of the measurement system employing a V-shaped guideline tracking tool.

As shown in FIGS. 1-4, measurement system 10 includes a frame assembly 12 positioned on a floor or other underlying surface 14 that supports a motor vehicle 16. The vehicle has one or more collision avoidance sensors that require angular measurement and adjustment. Frame assembly 12 comprises a plurality of perpendicularly interconnected elements that are typically composed of extruded aluminum or other durable (i.e. metal or synthetic) materials. More particularly, frame assembly 12 includes an elongate rectangular lower frame portion 18 placed directly on surface 14 and having a central rail 20 formed longitudinally therethrough from a forward end 22 to a rearward end 24 of the lower frame portion. A rectangular tire-engaging box portion 26, shown by itself in FIG. 3, is unitarily connected to central rail 20 of lower frame portion 12. Tire-engaging box portion 26 is oriented such that rail 12 engages underlying surface 14 and an upper segment 28 of box portion 26 extends parallel to rail 12. Segment 28 carries a pair of tire-engaging tabs 30 that are respectively engageable with angularly spaced apart locations on a rear wheel and tire of the vehicle such that rail 12 and segment 28 of tire-engaging box portion 26 are substantially aligned with the center line of motor vehicle 16. The vehicle center line is not specifically shown in FIG. 1, but is shown in FIGS. 7-9.

Figure 4:
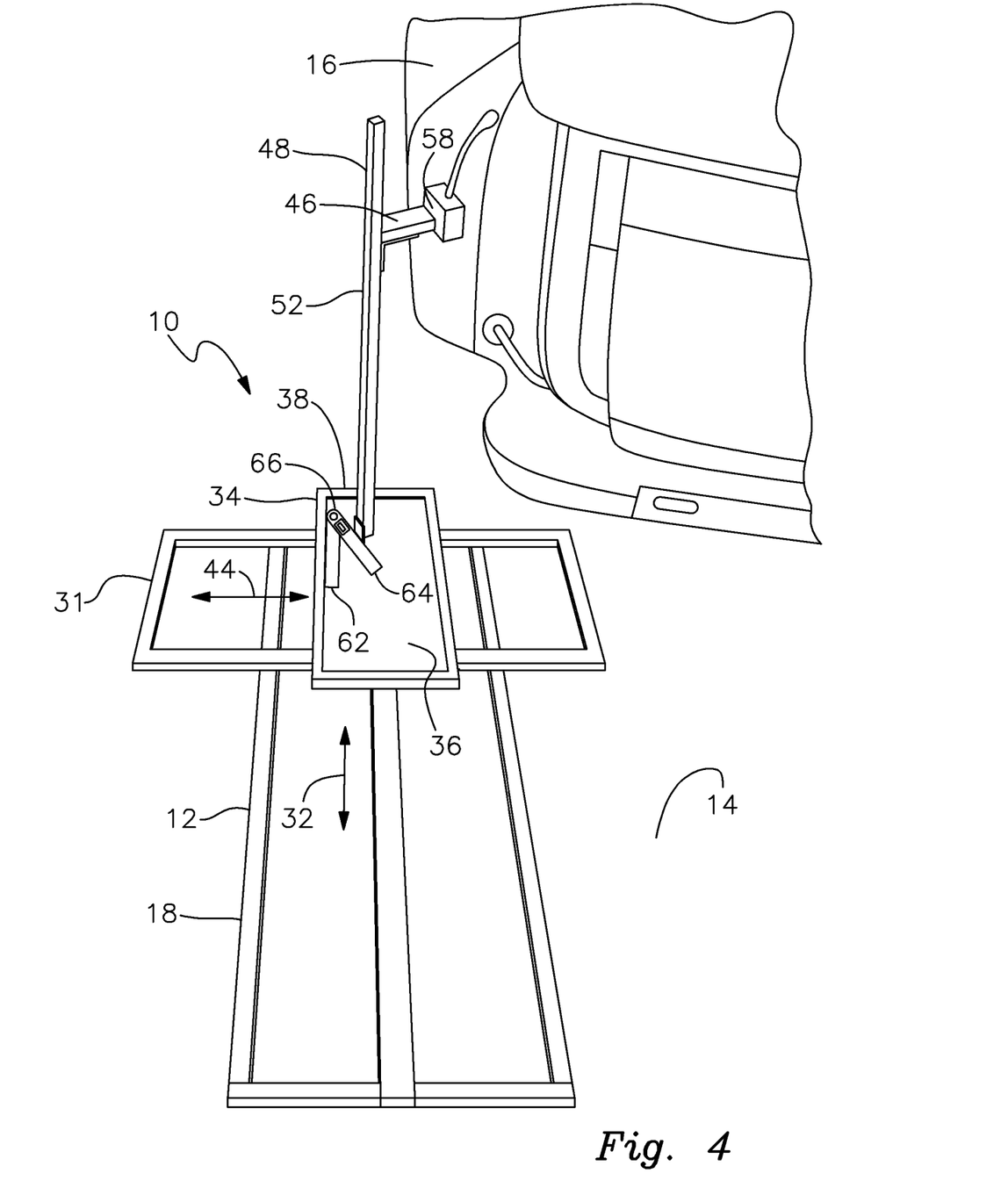
FIG. 4 is an alternative perspective view of the embodiment of FIG. 1 operatively interengaged with the collision avoidance sensor of a vehicle.

As further shown in FIGS. 1, 2 and 4, lower frame portion movably supports a rectangular upper frame portion 31. More particularly, upper frame portion 30 is oriented longitudinally transversely to lower frame portion 18 and is interconnected to the lower frame portion by slides, rollers or other structure, not depicted in detail, that allows the upper frame portion 31 to be moved longitudinally along lower frame portion 18 between the forward end 22 and the rearward end 24 of the lower frame portion, as indicated by double-headed arrow 32.

A rectangular calibration board 34 is adjustably mounted on upper frame portion 31. Calibration board 34 includes a generally planar panel 36 that is surrounded by a rectangular peripheral raised side edge or lip 38. Panel 36 and lip 38 may be composed of assorted materials including metals, synthetic or wood. Board 34 extends longitudinally transversely to upper frame portion 31 between the forward end 32 and rearward end 24 of lower base 18. Once again, slides, rollers or other means that will be known to persons skilled in the art may be utilized to movably interconnect board 34 to upper frame portion 31 such that the calibration board is capable of sliding longitudinally along rails 40 and 42 of upper frame portion 30 in the manner indicated by double headed arrow 44. As a result, calibration board 34 may be positionally adjusted both forwardly and rearwardly and laterally relative to supportive frame assembly 12. This allows the calibration board to be positioned relative to a vehicle and its radar sensors so that the angular orientation of the sensors may be properly measured and adjusted in the manner described below.

System 10 further includes a sensor module adaptive spacer 46 that is mounted to an elongate vertical support post 48. The support post preferably has a rectangular cross-sectional shape featuring a flat inner or forward longitudinal side 50 and a flat outer or rearward longitudinal side 52. Adaptive spacer 46 is supported on an adjustable bracket 54 that may comprise an L-bracket. Post 48 may have a plurality of positioning holes formed in inner surface 50 that allow the bracket 54 and adaptive spacer 46 to be positioned vertically along and supported on support post 48 at a height that corresponds with the height of the radar sensor module on the vehicle 16. Assorted types of screws, bolts or alternative releasable connectors may be employed to attach bracket 54 at the selected height on support element 48. Adaptive spacer 46 itself may be permanently or releasably interconnected to positioning bracket 54. The lower end of support post 48 is engaged with platform 36 of calibration board 34, as best shown in FIGS. 2 and 4.

Adaptive spacer 46 includes an inner end 56, FIGS. 1 and 2, that is shaped or configured to flushly and snugly conform to the shape or configuration of a particular radar sensor module being measured. See module 58, FIGS. 2 and 4. It is important that the inner end 56 of adaptive spacer 46 precisely or at least substantially conform to module 58 so that the angle of the radar sensors is effectively transposed to the generally planar outer longitudinal side 52 of support element 48. Each adaptive spacer should be provided with an inner face configuration that matches the specific profile of the sensor module being measured.

System 10 further includes a digital angle gauge 60, FIGS. 1, 2 and 4, comprising a pair of pivotally interconnected arms 62 and 64 and a standard digital angular readout device 66 featuring a microprocessor and/or other standard electronic components that calculate and display the angle between arms 62 and 64.

Typically system 10 is installed and utilized to measure the angle of one or more of a vehicle's collision avoidance sensors when the vehicle is being repaired following a collision or after suffering other damage to the bumper, rear quarter panel or other part of the vehicle. System 10 provides such angular measurements quickly and accurately so that the sensor alignment may be conveniently and correctly adjusted while repairs are being made. In operation, frame assembly 12 is installed, as shown in FIGS. 2-4, adjacent to vehicle 16 proximate the area being repaired and containing the radar sensors to be measured. Frame assembly 12 is placed on underlying surface 14 with tire-engaging box positioned against tire T. The wheel adjustment tabs are adjustably engaged with angularly spaced apart locations on the outer rim of the wheel and the forward end 22 of lower frame portion 18 is inserted snugly against the tread of the tire. Tabs 30 may be adjusted so that the upper segment 28 of box 26 is arranged substantially parallel to the rear tire and hence parallel to the center line of vehicle 16. By the same token, this effectively aligns center rail 20 and each of the longitudinal segments of lower frame portion 18 with the center line of the vehicle.

Next, calibration board 34 is generally aligned under the exposed sensor module 58. This is accomplished by adjusting upper frame portion 31 and supported calibration board 34 longitudinally along lower frame portion 18 as indicated by doubled-headed arrow 32. The calibration board 34 itself is likewise adjusted relative to segments 40 and 42 of upper frame portion 31 so that the calibration board is positioned/centered beneath sensor module 58. The user then operably installs vertical support post 48 between panel 36 of calibration board 34 and sensor module 58. More particularly, the lower end 49 of support post 48 is engaged with the upper surface of panel 36. The inner end 56 of adaptive spacer 46 is flushly and conformably interengaged with the matching profile of sensor module 58. As previously stated, the adaptive spacer being used should have an inner end 56 that closely, if not precisely matches the profile of the sensor module being measured.

When the adaptive spacer is properly interengaged with sensor module 58, the lower end 49 of support post 48 interengages platform 36 such that flat rearward face 52 of post 48 defines on platform 36 an angular guideline corresponding to the horizontal angular inclination of the sensor module being measured. That inclination is then measured by utilizing digital angle gauge 60. Specifically, arm 62 of gauge 60 is flushly interengaged with longitudinal segment 70 of peripheral raised edge or lip 38 of calibration board 34. That lip, best shown in FIGS. 2 and 4, represents a base guideline. Because longitudinal rail 20 of lower frame portion 8 is parallel to the center line of the vehicle and the longitudinal side segment 70 of rectangular calibration board 34 is parallel to rail 20, the base guideline defined by straight edge segment 70 of lip 38 is likewise parallel to the vehicle's center line. Accordingly, the angle of the radar sensor module 58 is effectively transposed onto panel 36 of calibration bard 34 and is represented by the angle formed between the base guideline (raised side edge 70) and the angular guideline (represented by rearward side 52 of support element 48). Digital angle gauge 60 measures the angle between the base guideline and the angular guideline and thereby accurately determines the angle at which the sensor module is directed. That measured angle can then be quickly compared with the factory prescribed sensor angle settings for the vehicle and the sensors being installed are realigned if needed to conform to the manufacturer's specifications. This realignment can be accomplished by performing appropriate adjustments or modifications to the bodywork or repair work. The measurements can then be retested quickly and conveniently, as often as needed and while the work is being performed, until the prescribed angle is achieved.

Figure 5:
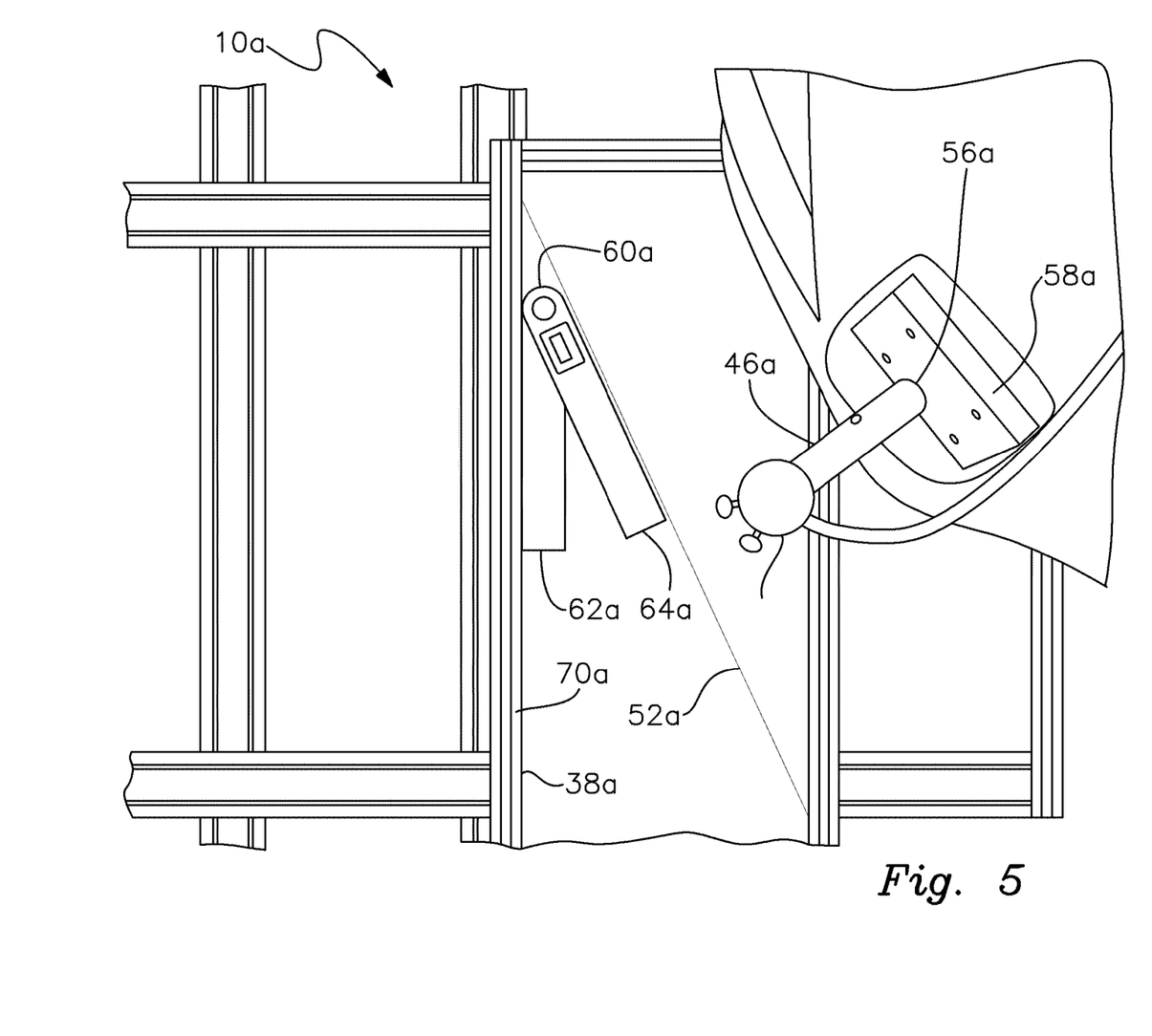
FIG. 5 is a top perspective view of an alternative version of this invention wherein the angular guideline is generated by a laser line projector.
Figure 6:
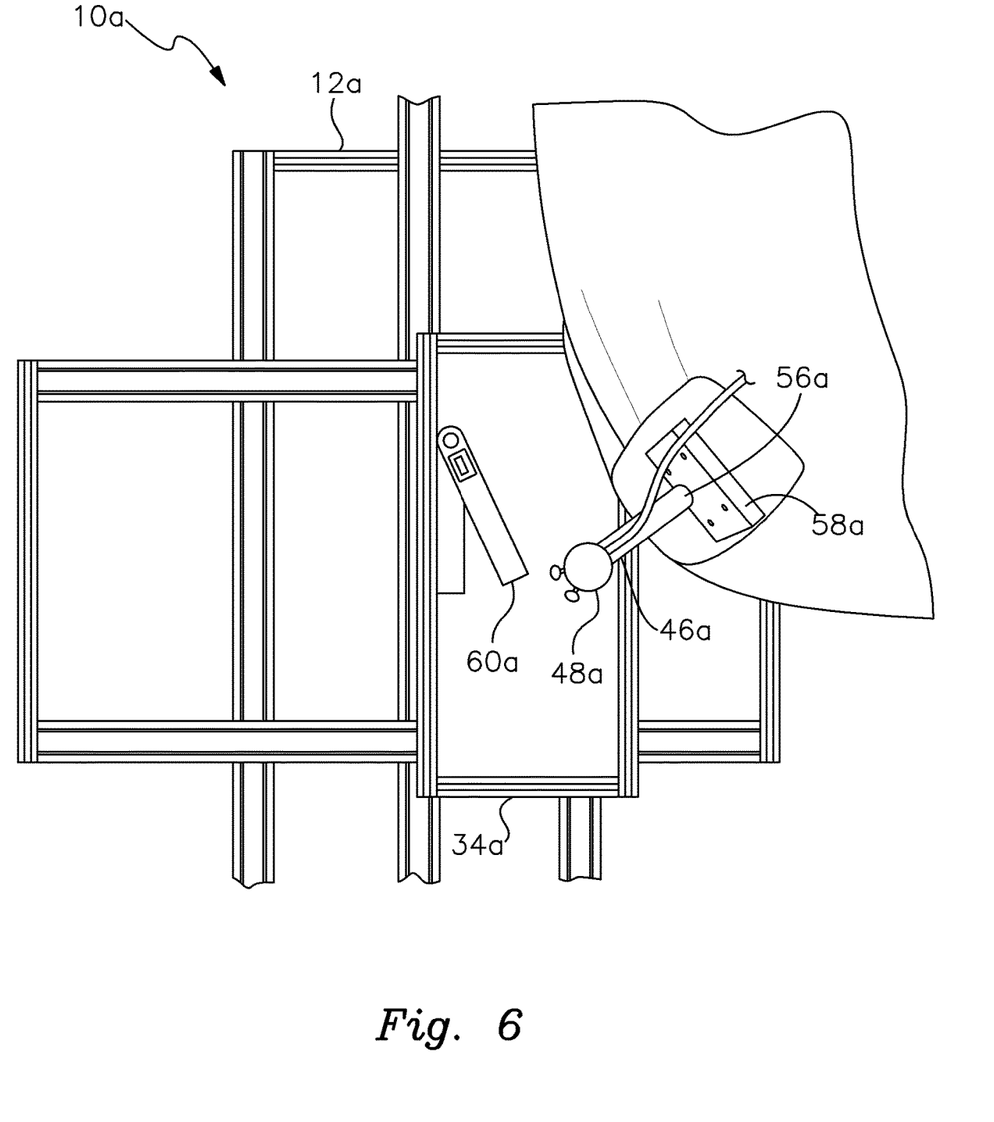
FIG. 6 is an alternative top perspective view of the version of FIG. 5.

An alternative measurement system 10a is disclosed in FIGS. 5 and 6. System 10a comprises a frame assembly 12a that is identical or analogous to the frame assembly previously described. Likewise, a calibration board 34a and a digital angle gauge 60a may be employed and these components may be identical or analogous to the corresponding components described above. In system 10a, the previously described vertical support post 48 is replaced by a laser line projector 48a. The laser line projector is mounted to the outer end of an adaptive spacer 46a, which, in turn, has an inner end 56a that conformably matches the profile of laser module 58a. The adaptive spacer may be secured provisionally to the sensor module by tape, hook and loop material, or alternative means of connection. As a result, the adaptive spacer holds the laser projector 48a at an angle that represents or corresponds to the angle of orientation of the radar sensors relative to the vehicle.

When the laser projector 48a carried by spacer 46a is activated, it projects a laser line 52a that represents an angular guideline corresponding to the horizontal angular inclination of the collision avoidance sensor. The angle of the sensor is thereby effectively transposed onto panel 36a of calibration board 38a. Digital angle gauge 60a is then operated in a manner analogous to that previously described to obtain this angle in a quick, convenient and accurate manner. Specifically, arm 62a of gauge 60a is aligned and interengaged with raised edge segment 70a of a peripheral lip 38a, which represents the base guideline on the calibration board. Arm 64a is likewise aligned with the projected laser line forming the angular guideline 52a. The angle between segment 70a of lip 38 and laser line 52a represents the angle of orientation of the sensor. That angle can be realigned, if required, to meet the specifications for the motor vehicle being repaired. Again, this realignment or adjustment can be made quickly and conveniently by the user while the autobody repair is being performed.

FIGS. 7-8B illustrate an alternative system 10b according to this invention. This version employs a calibration mat 34b featuring a center line 80b for aligning with the center line CL of the vehicle. Mat 34b includes a series of parallel calibration guidelines 70b, which are in turn parallel to center line 80b and are spaced approximately 6" apart.

When working on the rear of the vehicle (i.e. when the sensors are in the rear bumper or rear quarter panel) mat 34b should be placed rearwardly of the vehicle such that the center line 80b of mat 34b is aligned with the vehicle's center line CL. The center line CL of the vehicle is determined by dropping a plumb line 90b, FIG. 8A, from the front and rear hood and trunk badges or ornaments respectively. This allows the user to mark the center line as extending from the front and the rear of the vehicle. Spots on the center line can be marked on the underlying surface using tape and a string may be extended between the and beyond the marked spots and taped in place to indicate the vehicle's center line. The center line 80b of calibration mat 34b can then be aligned with center line CL. After the foregoing steps are completed, a vertical support post 48 as previously described and, attached adaptive spacer 46 are interconnected between mat 90b and the sensor module being angularly measured. As previously described, the inner face of the adaptive, spacer element 46 is flushly and conformably engaged with the sensor module. As a result, adaptive spacer 46 holds support post 48 at an angular orientation relative to the sensor module. More particularly, as indicated in FIGS. 8A and 8B, rearward face 52 of element 48 is held at an angle that represents the horizontal angle at which the sensor is directed from the vehicle. The lower end 49 of element 48 engages calibration mat 34b and therefore surface 52 of post 48 forms an angular guideline along the calibration mat, which represents the angular orientation of the sensor module. The base guideline is defined by a nearby calibration guideline 70b on mat 34b. Analogous to the previously described embodiment, digital angle gauge 60 is deployed with arm 62 aligned with calibration or base guideline 70b and arm 64 engaging and aligned with rearward surface 52 of rectangular support post 48. Once again, the base guideline 70b is parallel to the center line of the vehicle and the angular guideline represented by surface 52 corresponds to the angle of the sensor module. The angle gauge thereby provides a transposed measurement of the angular orientation of the sensor module. If the measured angular orientation differs from the manufacturer's specifications, appropriate body or repair work can be performed to adjust the angle so that it meets those specifications.

FIG. 9 discloses still another version of the measurement system. In this embodiment, system 10c again includes an adaptive spacer component 46 and a height-adjustable vertical support element 48 that are constructed and operate analogously to the elements previously described. As in the embodiment of FIGS. 7-8B, the vehicle's center line is plumbed and marked. A tape, string or other straight edge is used to extend the center line approximately 10' beyond the rear of the vehicle. The supportive post 48 and attached adaptive spacer 46 are installed in the manner previously described. In particular, the distal end of the adaptive spacer is conformably engaged with the matching profile of the particular sensor module being measured. Adaptive spacer 46 is longitudinally adjusted along and secured to vertical support post 48 so that the adaptive spacer is held at a height corresponding to the interengaged sensor module. The lower end 49 of vertical support element 48 engages the underlying surface 14 and may include a hinge or other flat base for stably engaging the underlying surface. As in the previously described embodiments, adaptive spacer 46 holds support post 48 at an angle relative to the interengaged sensor module that corresponds to the angular orientation of the particular sensor being measured. Again, post 48 includes a planar rearward side 52 that defines an angular guideline corresponding to the angular orientation of the sensor.

Figure 10:
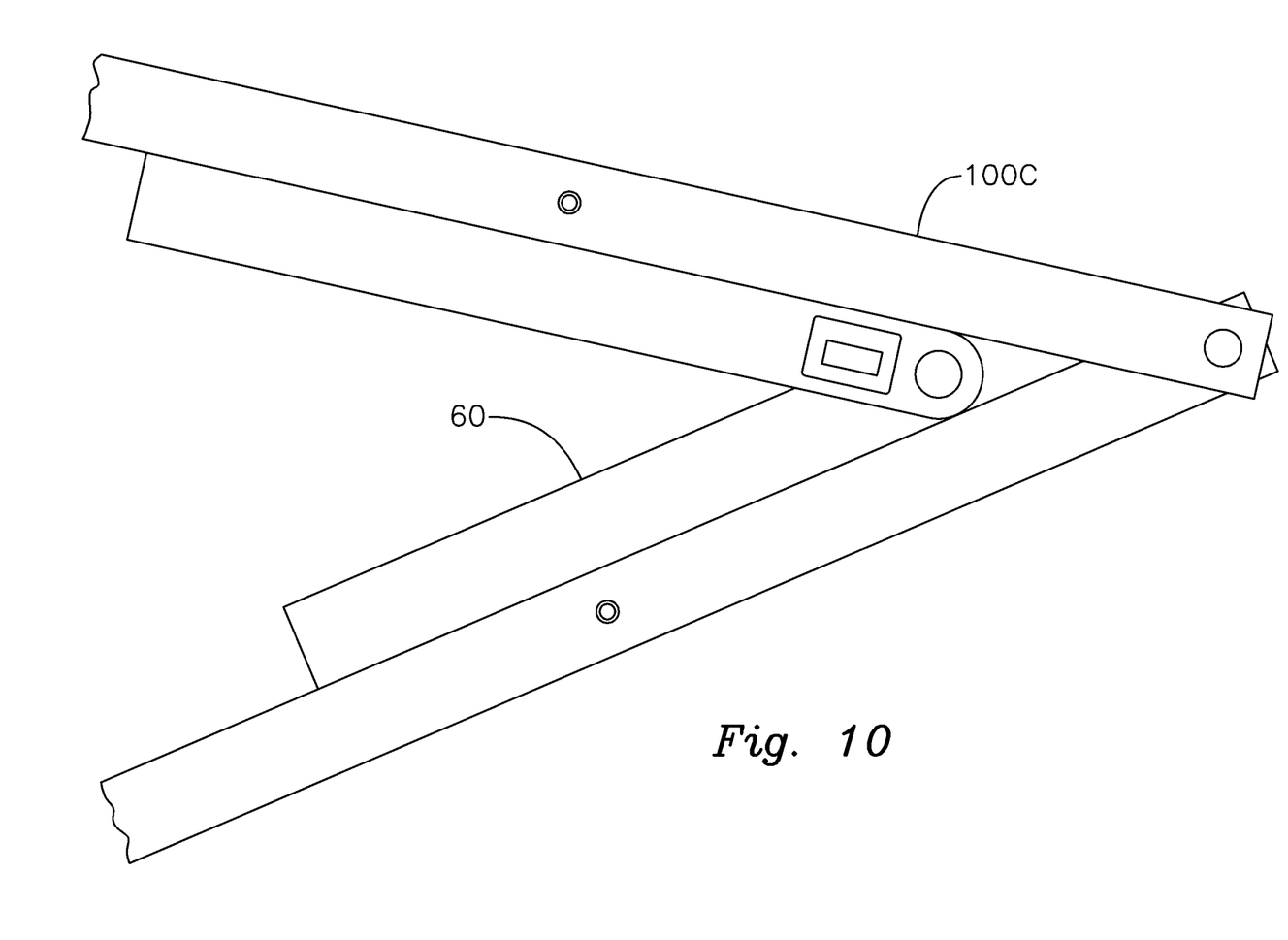
FIG. 10 is a top view of the pivotable guideline tracking tool employed in the version of FIG. 9 as interengaged with a digital angle gauge for measuring the angular orientation of the collision avoidance sensors.

A V-shaped guideline tracking, tool 100c is disposed on underlying surface 14 behind the motor vehicle. Tracking tool 100c includes a first arm 102c that is aligned with the previously determined center line of the vehicle. Arm 100c is opened and aligned with flat rearward facing side 52 of support post 48. Accordingly, arms 100 and 102c are respectively aligned with the angular guideline and base guideline of system 10c. Digital angle gauge 60 is conformably interengaged at the vertex of tracking device 100c in the manner best shown in FIG. 10. As a result, angular gauge 60 provides an accurate measure of the angle between the orientation angle guideline (represented by rearward side surface 52 of post 48) and the base guideline (represented by the center line CL) of the vehicle. This angle accurately corresponds to the horizontal angle at which the vehicle sensor is pointed. As in the prior embodiments, if this measured angle differs from the factory specified angle, it may be quickly and conveniently adjusted during the repair of the vehicle and retested as needed.

The system of the present invention allows for radar sensors of automotive collision avoidance systems to be quickly and conveniently checked and adjusted as needed when a vehicle is repaired after a collision or otherwise being damaged. This system eliminates guess work and repeated adjusting of sensor angles, which can be extremely tedious, frustrating and expensive both for repair shops and customers. Each embodiment disclosed herein can be used effectively and beneficially on both sides of the vehicle.

The system of this invention enables the user to obtain an extremely accurate angle measurement for the vehicle's collision avoidance sensors relative to the center/longitudinal/straight line/of the vehicle. The adaptive spacer allows the system to be employed with radar sensor modules having various shapes, sizes and profiles. Accordingly, the system can be used with virtually all makes and models of motor vehicles by employing an adaptive spacer that matches the profile of the sensor module involved. By employing either the height-adjustable support element or the laser line projector, the system can be adapted to be used effectively for sensors mounted at various vehicle heights. The adapter spacer may be either raised or lowered, as required, to be used on both tall vehicles such as pickup trucks and SUVs and passenger vans, as well as low to the ground vehicles such as sports cars. The spacer enables the system to be effectively engaged with radar sensors mounted in a deep cavity surrounded by vehicle structure such as bumper taillights.

By employing the system of this invention, repair shops are not forced to rely upon the motor vehicle's diagnostics system to determine the accuracy of the angular settings. This can save the repair shop considerable time, expense and frustration typically incurred when vehicle diagnostic systems are relied upon, and repeated testing and realignments are needed.

From the foregoing it may be seen that the apparatus of this invention provides for a system for quickly, conveniently and accurately measuring the angular orientation of automotive collision avoidance sensors. While this detailed description has set forth particularly preferred embodiments of the apparatus of this invention, numerous modifications and variations of the structure of this invention, all within the scope of the invention, will readily occur to those skilled in the art. Accordingly, it is understood that, this description is illustrative only of the principles of the invention and is not limitative thereof.

Although specific features of the invention are shown in some of the drawings and not others, this is for convenience only, as each feature may be combined with any and all of the other features in accordance with this invention.

What is claimed is:

1. A system for measuring the horizontal angular inclination between an automotive collision avoidance sensor module and a longitudinal centerline of a motor vehicle to which the automotive collision avoidance sensor module is mounted, said system comprising:
   a calibration component disposed below the sensor module, said calibration component having a horizontal upper surface, said horizontal upper surface carrying a base guideline that is aligned with or parallel to the longitudinal centerline of the motor vehicle;
   a vertical support post engaging and extending upwardly from said horizontal upper surface of said calibration component; said vertical support post being positioned outwardly of the sensor module;
   a spacer component carried by said support post, said spacer component having an inner end configured for engaging an outer surface of the sensor module such that the spacer component extends outwardly from the sensor module to said support post;
   said support post having a longitudinal side that is parallel to and spaced outwardly of the outer face of the sensor module, said longitudinal side of said support post defining an angular guideline at a lower end of said support post on said calibration component, said angular guideline being extendable across said horizontal surface of said calibration component to intersect said base guideline at a horizontal angular inclination that matches the horizontal angular inclination between the automotive collision avoidance sensor module and the longitudinal centerline of the motor vehicle; and
   an angle measuring gauge for engaging the base guideline and the angular guideline to determine the angle at which the angular guideline intersects the base guideline and the matching horizontal angular inclination between the sensor module and the centerline of the motor vehicle.

2. The system of claim 1 in which said calibration component is mounted to a frame assembly that includes a lower frame for mounting on an underlying surface and an upper frame adjustably mounted on said lower frame and being selectively movable thereon in opposing directions substantially parallel to the longitudinal centerline of the motor vehicle.

3. The system of claim 2 in which said calibration component includes a calibration board supported by said upper frame and movable therewith in opposing directions that are perpendicular to the longitudinal centerline of the motor vehicle and a longitudinal axis of travel of said upper frame on said lower frame.

4. The system of claim 3 in which said calibration board includes a longitudinal side edge segment that defines said base guideline.

5. The system of claim 4 in which said longitudinal side edge segment includes an elongate lip that defines said base guideline.

6. The system of claim 4 further including a tire-engaging box component interconnected to said lower frame and holding said lower frame in place such that said base guideline remains parallel to the centerline of the motor vehicle.

7. The system of claim 6 in which said box component includes a plurality of tabs for engaging a respective wheel trim.

8. The system of claim 1 in which said support post includes an opposing longitudinal side, said spacer component being secured at said distal end to said opposing longitudinal side of said post at a selected height for corresponding to the height at which the sensor module is mounted.

9. The system of claim 1 in which said calibration component includes a calibration mat for extending across an underlying surface on which the motor vehicle is supported, said mat including a plurality of calibration lines that are parallel to the longitudinal centerline of the motor vehicle, a selected said calibration line defining said base guideline.

10. The system of claim 9 in which said vertical support post engages and extends upwardly from said mat.

11. The system of claim 10 in which said support post includes an opposing longitudinal side, said spacer component being secured at said distal end to said opposing longitudinal side of said support post at a selected height for corresponding to the height at which the sensor module is mounted.

12. The system of claim 1 in which said base guideline is defined by and co-extensive with the longitudinal centerline of the motor vehicle.

13. The system of claim 1 in which said angle measuring gauge includes a pair of pivotally interconnected arms, a first of said arms for engaging said angular guideline and a second of said arms for engaging said base guideline such that the angle between said first and second arms corresponds to the angle between said angular guideline and said base guideline.

14. A system for measuring the horizontal angular inclination between an automotive collision avoidance sensor module and a longitudinal centerline of a motor vehicle to which the automotive collision avoidance sensor module is mounted, said system comprising:

- a calibration component disposed below the sensor module, said calibration component having a horizontal upper surface, said horizontal upper surface carrying a base guideline that is aligned with or parallel to the longitudinal centerline of the motor vehicle;

- a spacer component having an inner end configured for engaging an outer face of the sensor module such that said spacer component extends outwardly from the sensor module;

- a laser line projector supported by a distal portion of said spacer component for generating a laser line marking to represent an angular guideline on said horizontal upper surface of said calibration component, which said angular guideline is parallel to and spaced outwardly of the outer face of said sensor module, said angular guideline being extendable across said horizontal surface of said calibration component to intersect said base guideline at a horizontal angular inclination that matches the horizontal angular inclination between the automotive collision avoidance sensor module and the longitudinal centerline of the motor vehicle; and

- an angle measuring gauge for engaging the base guideline and the angular guideline to determine the angle at which the angular guideline intersects the base guideline and the matching horizontal angular inclination between the sensor module and the centerline of the motor vehicle.

* * * * *